(12) United States Patent
Gabriel et al.

(10) Patent No.: US 7,788,724 B2
(45) Date of Patent: *Aug. 31, 2010

(54) SYSTEM AND METHOD FOR DETECTING MALICIOUS APPLICATIONS

(75) Inventors: Basil Gabriel, Downey, CA (US); Mark Spiegel, West Hills, CA (US)

(73) Assignee: Symantec Corporation, Mountain View, CA (US)

( * ) Notice: Subject to any disclaimer, the term of this patent is extended or adjusted under 35 U.S.C. 154(b) by 979 days.

This patent is subject to a terminal disclaimer.

(21) Appl. No.: 10/412,708

(22) Filed: Apr. 10, 2003

(65) Prior Publication Data

US 2004/0205354 A1 Oct. 14, 2004

(51) Int. Cl.
*G06F 12/14* (2006.01)
(52) U.S. Cl. .................. 726/25; 726/22; 726/26; 726/30; 713/188
(58) Field of Classification Search ............ 726/2–33
See application file for complete search history.

(56) References Cited

U.S. PATENT DOCUMENTS 6,801,929 B1 * 10/2004 Donoho et al. ............ 709/204
6,850,943 B2 * 2/2005 Teixeira et al. ............ 707/10
6,868,448 B1 * 3/2005 Gupta et al. ............... 709/226
6,889,209 B1 * 5/2005 Rabin et al. ............... 705/57
6,934,857 B1 * 8/2005 Bartleson et al. ........... 726/5
2002/0144156 A1 * 10/2002 Copeland, III ............. 713/201

OTHER PUBLICATIONS

PC Flank: Make sure you're protected on all sides, Mar. 27, 2002, http://www.pcflank.com/art21.htm.
Atelier Web Firewall Tester- Advance Leaktest Suite, http://www.atelierweb.com/awft/.
Brian McWilliams, Personal Firewalls Spring Security Leaks—Update, Nov. 7, 2001, Newsbytes. Originally at http://www.newsbytes.com/news/01/171949.html. An archived copy is located at http://web.archive.org/web/20020204155221/http://www.newsbytes.com/news/01/171949.html.

* cited by examiner

*Primary Examiner*—Pramila Parthasarathy
(74) *Attorney, Agent, or Firm*—Hunton & Williams, LLP

(57) ABSTRACT

A system and method are disclosed for detecting malicious computer applications. According to an embodiment of the present invention, it is determined whether a communication is attempting to occur, wherein the communication is associated with a first application. It is also determined whether there is a second application associated with the first application; and also determined whether the second application is trusted.

14 Claims, 8 Drawing Sheets

SYSTEM AND METHOD FOR DETECTING MALICIOUS APPLICATIONS

FIELD OF THE INVENTION

The present invention relates generally to computer security. More specifically, a system and method for detecting a particular type of computer application is disclosed.

BACKGROUND OF THE INVENTION

Computer security is becoming a crucial issue in modern business. Firewalls are often used to protect a system or a network. A firewall is usually a set of related programs, located, for example, at a network gateway server, that protects the resources of a private network from users of other networks. An enterprise with an intranet that allows its users access to the wider Internet typically installs a firewall to prevent outsiders from accessing its own private data resources. A potential problem is that there is a new breed of applications, typically referenced to as leak applications, that leaks data out of a system without the user realizing it. These leak applications typically defeat firewalls.

What is needed is a system and method for detecting and stopping malicious applications. The present invention addresses such a need.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
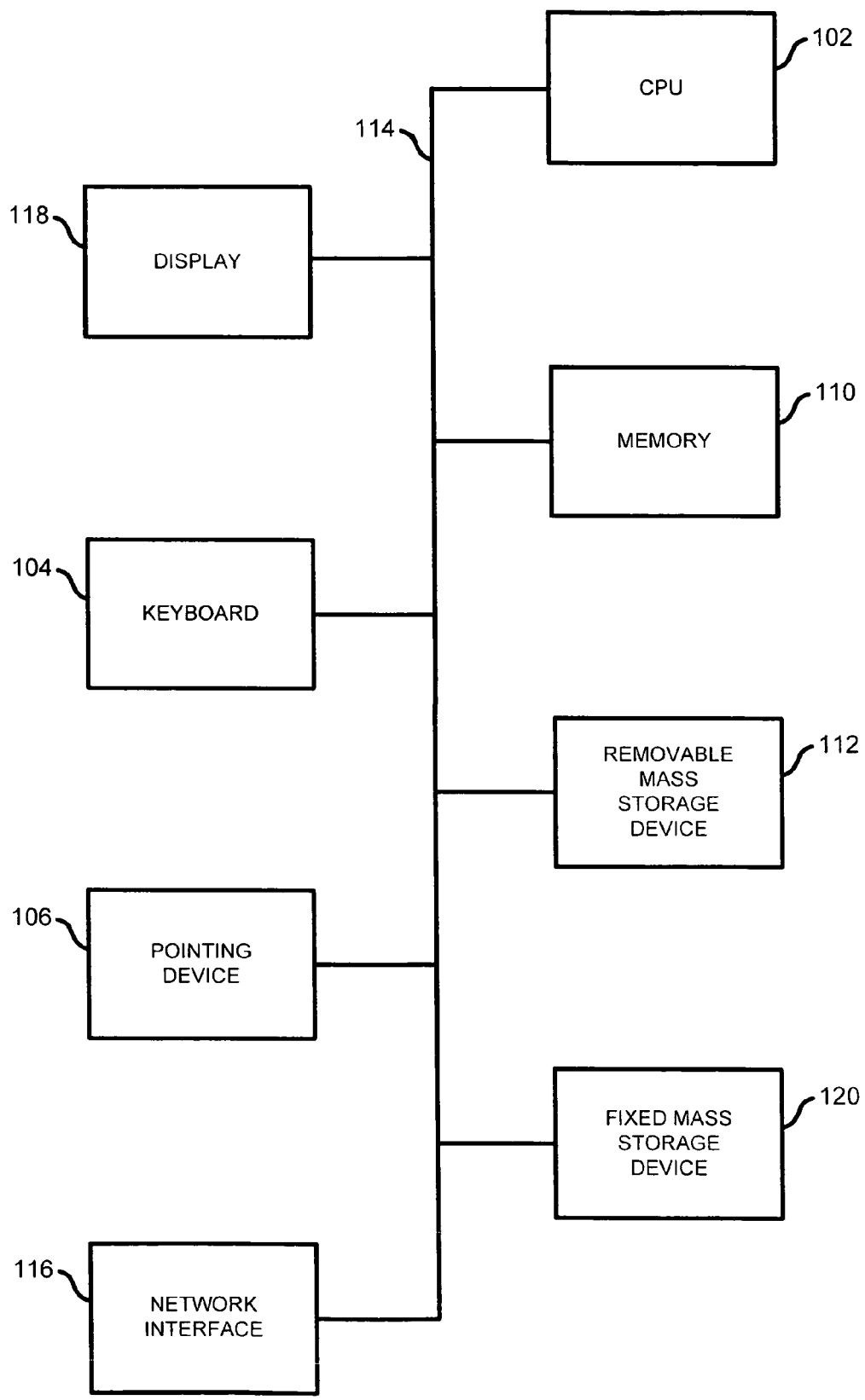
FIG. 1 is a block diagram of a general purpose computer system suitable for carrying out the processing in accordance with an embodiment of the present invention.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 1 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 2A:
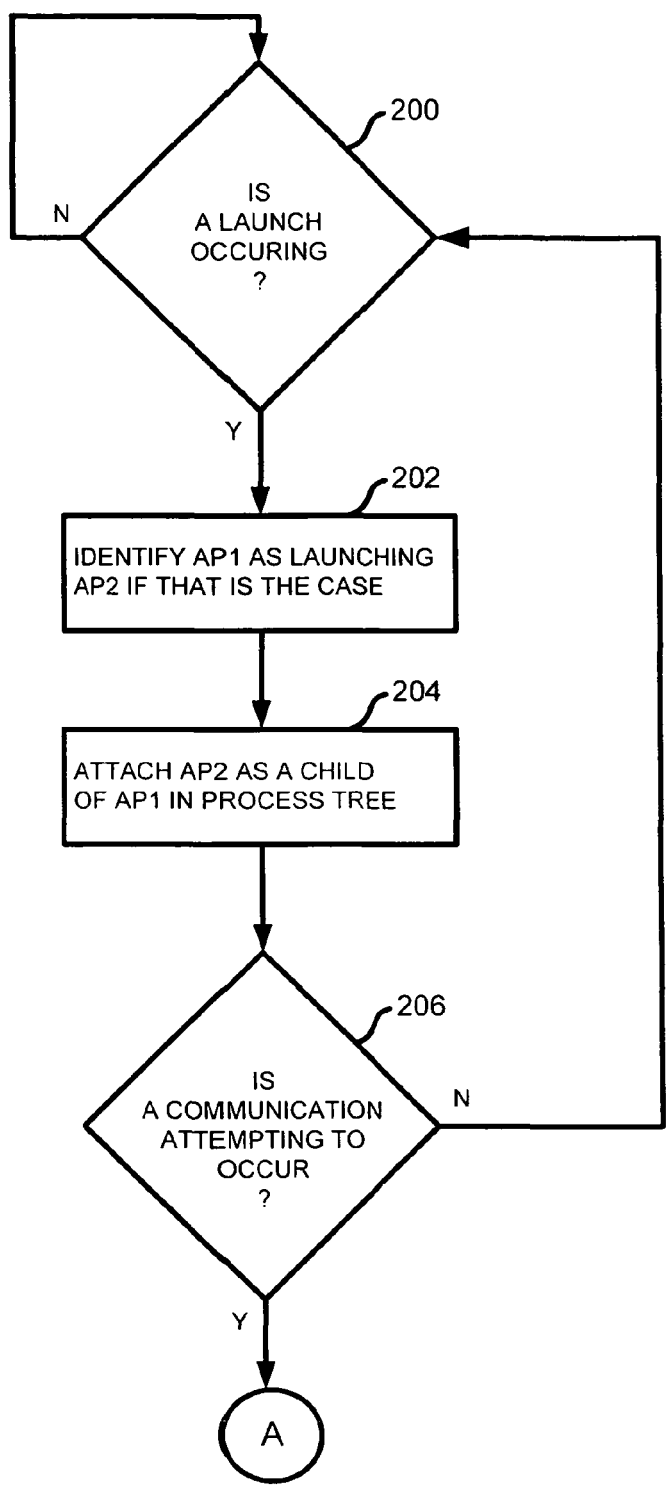
FIGS. 2A-2C are flow diagrams of a method according to an embodiment of the present invention for detecting a malicious application.
Figure 2B:
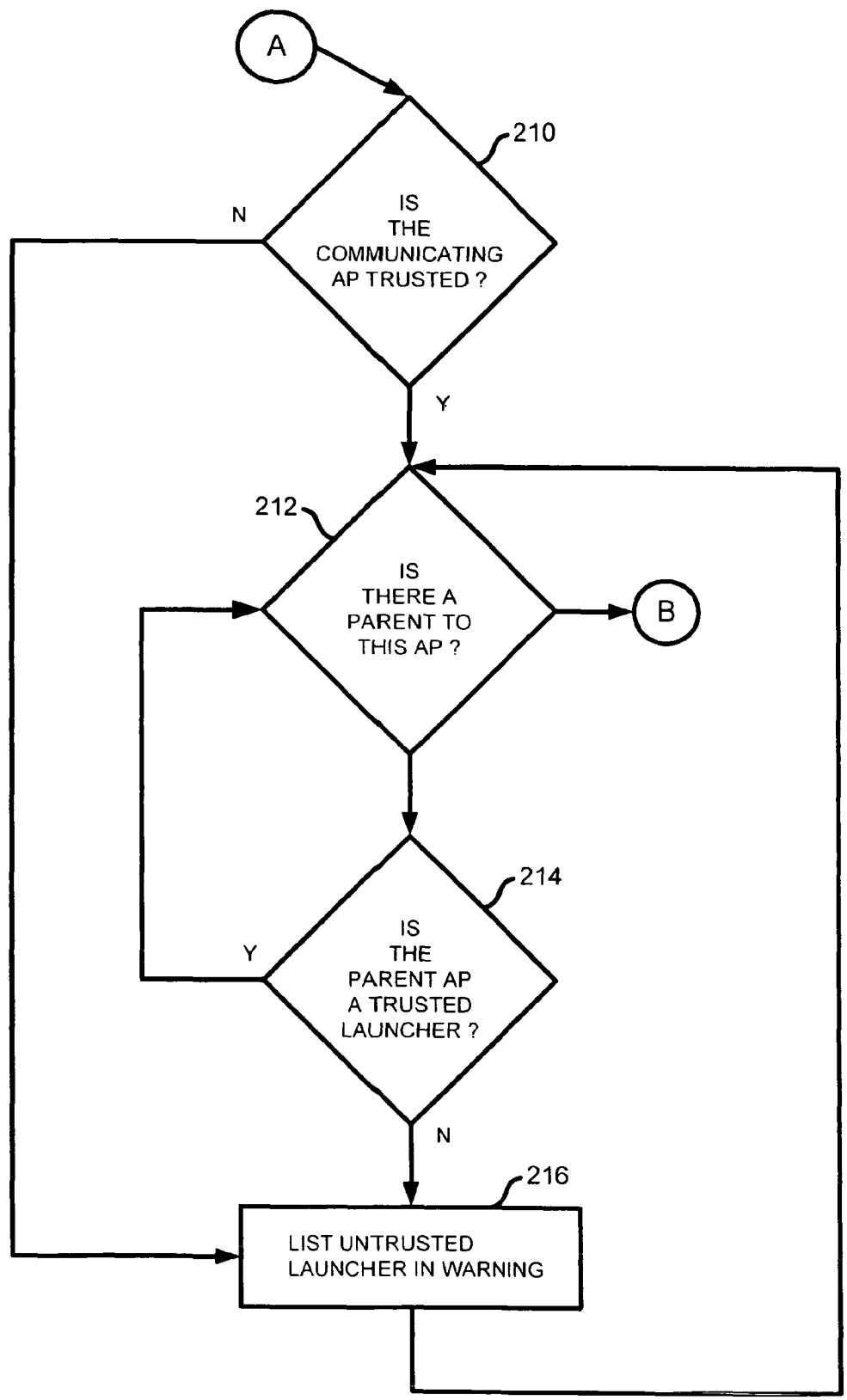
Figure 2C:
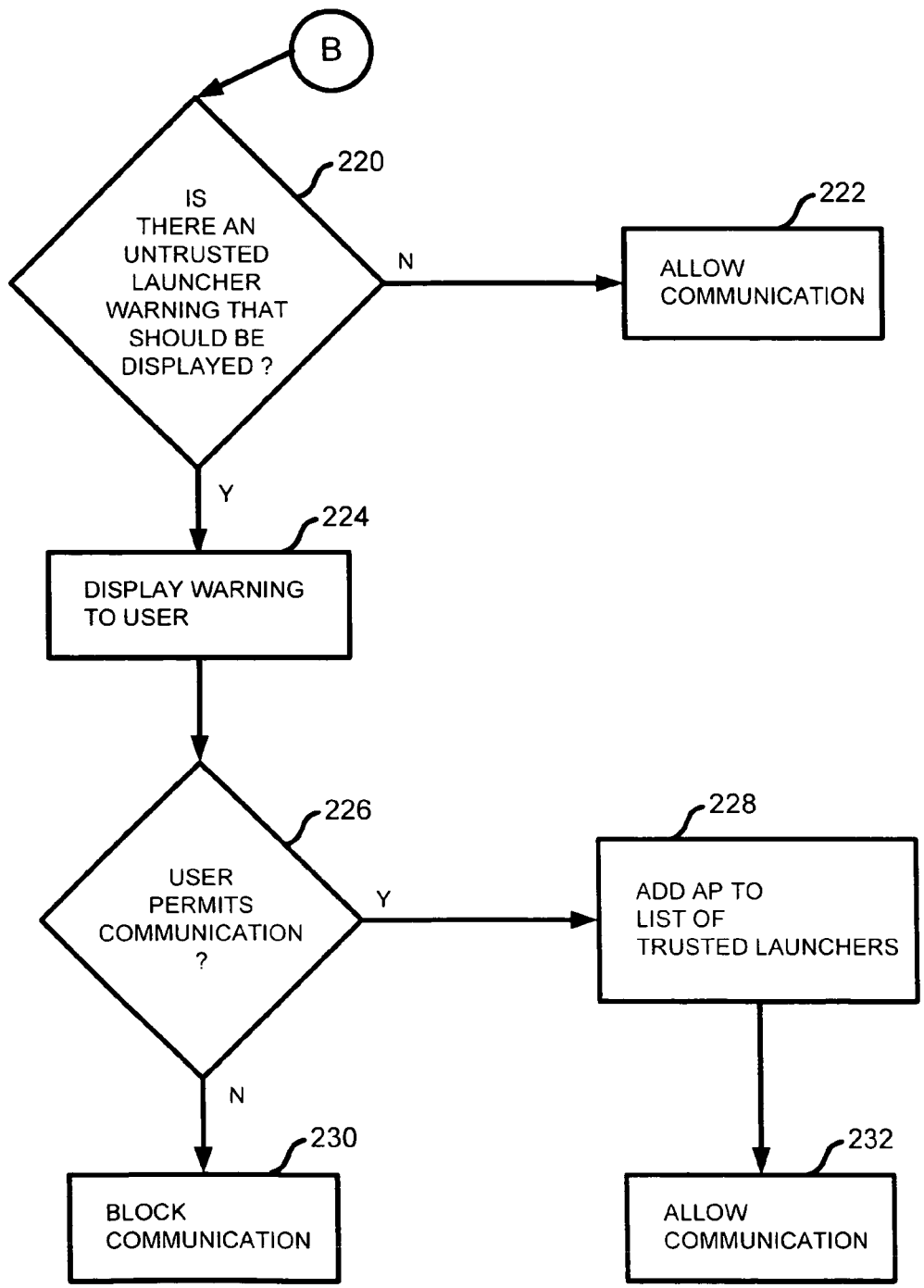

FIGS. 2A-2C are flow diagrams of a method according to an embodiment of the present invention for detecting a malicious application. A leak application typically launches a trusted application, such as Microsoft Internet Explorer, and fools the firewall into sending data out to a web site through the trusted application. The firewall typically allows the communication because it appears as though the trusted application is performing the communication. However, the leak application is actually in control of the communication.

In FIG. 2A, it is determined whether the launch of an application is occurring (200). If a launch is occurring then a first application is identified as launching a second application, if that is the case (202). The second application is then identified as a child of the first application in a process tree (204). It is then determined whether a communication is attempting to occur (206). If there is no communication attempting to occur, the system continues to monitor whether an application launch is occurring (200).

The method shown in FIG. 2A can be performed in two separate threads of execution: one for monitoring communications and one for monitoring application launches. In this manner, application launches and communications can be monitored substantially concurrently.

If a communication is attempting to occur, then it is determined whether the communicating application is trusted (210). If the communicating application is trusted, it is determined whether there is a parent to this application (212). If there is a parent to this application, then it is determined whether the parent is a trusted launcher (214). If the parent application is a trusted launcher, then it is determined whether there is a further parent to this parent application (212). If, however, a parent application is not a trusted launcher (214), then the untrusted launcher is listed in a warning to be presented to the user (216). It is then determined whether there is a parent to the untrusted launcher (212). The untrusted launcher is also listed in the warning (216) if it was initially determined that the communicating application is not trusted (210).

If it is determined that there is no parent to this application which is being evaluated (212), then it is determined whether there is an untrusted launcher warning that should be displayed (220 of FIG. 2C). If there is no untrusted launcher warning that should be displayed (220), then the communication is allowed (222). If, however, there is an untrusted launcher warning to be displayed (220), then the warning is displayed to the user (224). It is then determined whether the user permits the communication (226). If the user does not permit it, then the communication is blocked (230). If, however, the user permits the communication (226), then the application is added to the list of trusted launchers (228), and the communication is allowed (232).

Figure 3:
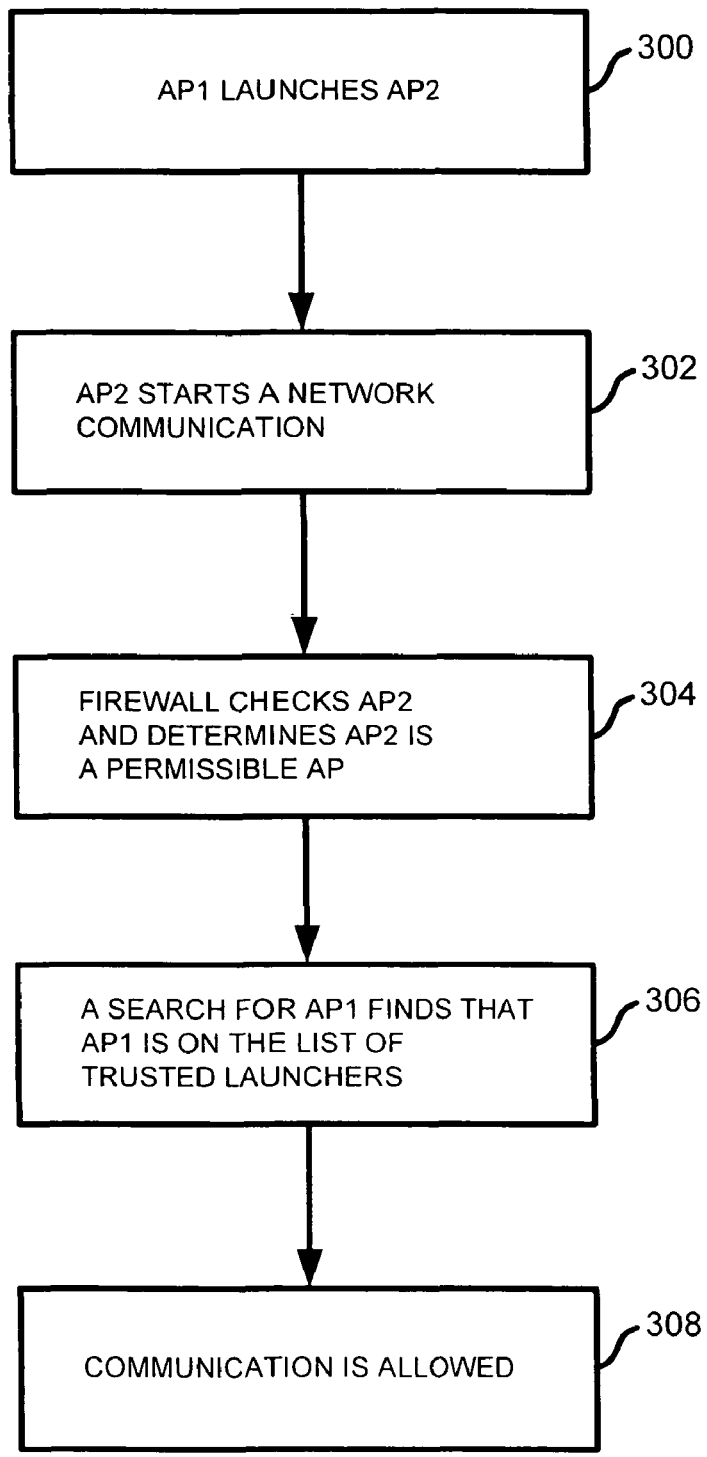
FIG. 3 is a flow diagram of an example of a situation managed by a method for detecting malicious applications according to an embodiment of the present invention.

FIG. 3 is a flow diagram of an example of a situation managed by a method according to an embodiment of the present invention. In this example, a first application launches a second application (300). The second application then starts a network communication (302). The firewall then checks the second application and determines that the second application is a permissible application (304). A search for the first application finds that the first application is on the list of trusted launchers (306). In this situation, the communication is allowed (308).

Figure 4:
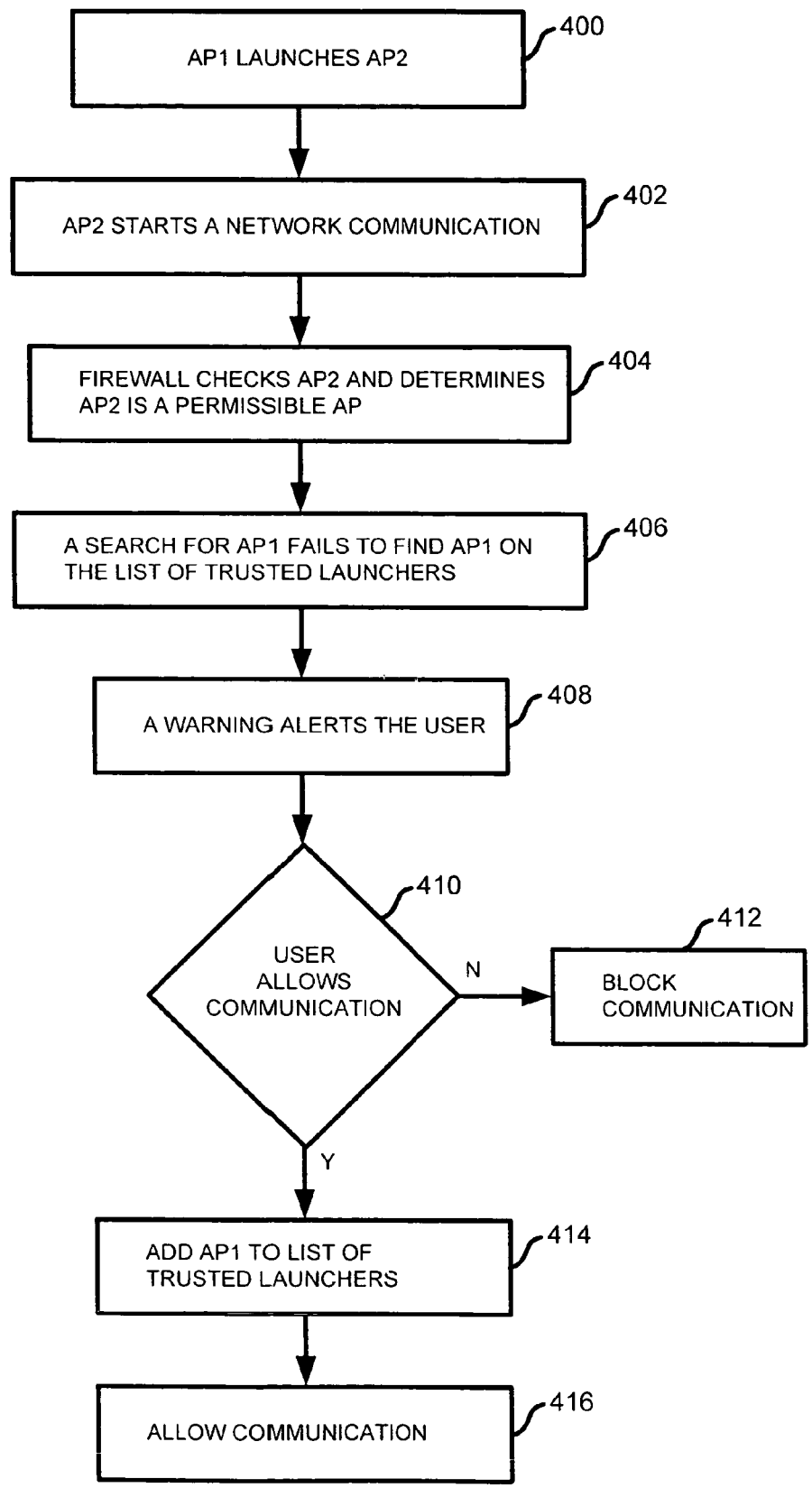
FIG. 4 is another example of an application of a method for detecting malicious applications according to an embodiment of the present invention.

FIG. 4 is another example of an application of a method according to an embodiment of the present invention. In this example, a first application launches a second application (400). The second application starts a network communication (402). The firewall checks the second application and determines that the second application is a permissible application (404). A search for the first application fails to find the first application on the list of launchers (406). In this case, a warning alerts the user (408). It is then determined whether the user allows the communication (410). If the user does not allow the communication, the communication is blocked (412). If, however, the user allows the communication then the first application is then added to the list of trusted launchers (414), and the communication is allowed (416).

Figure 5:
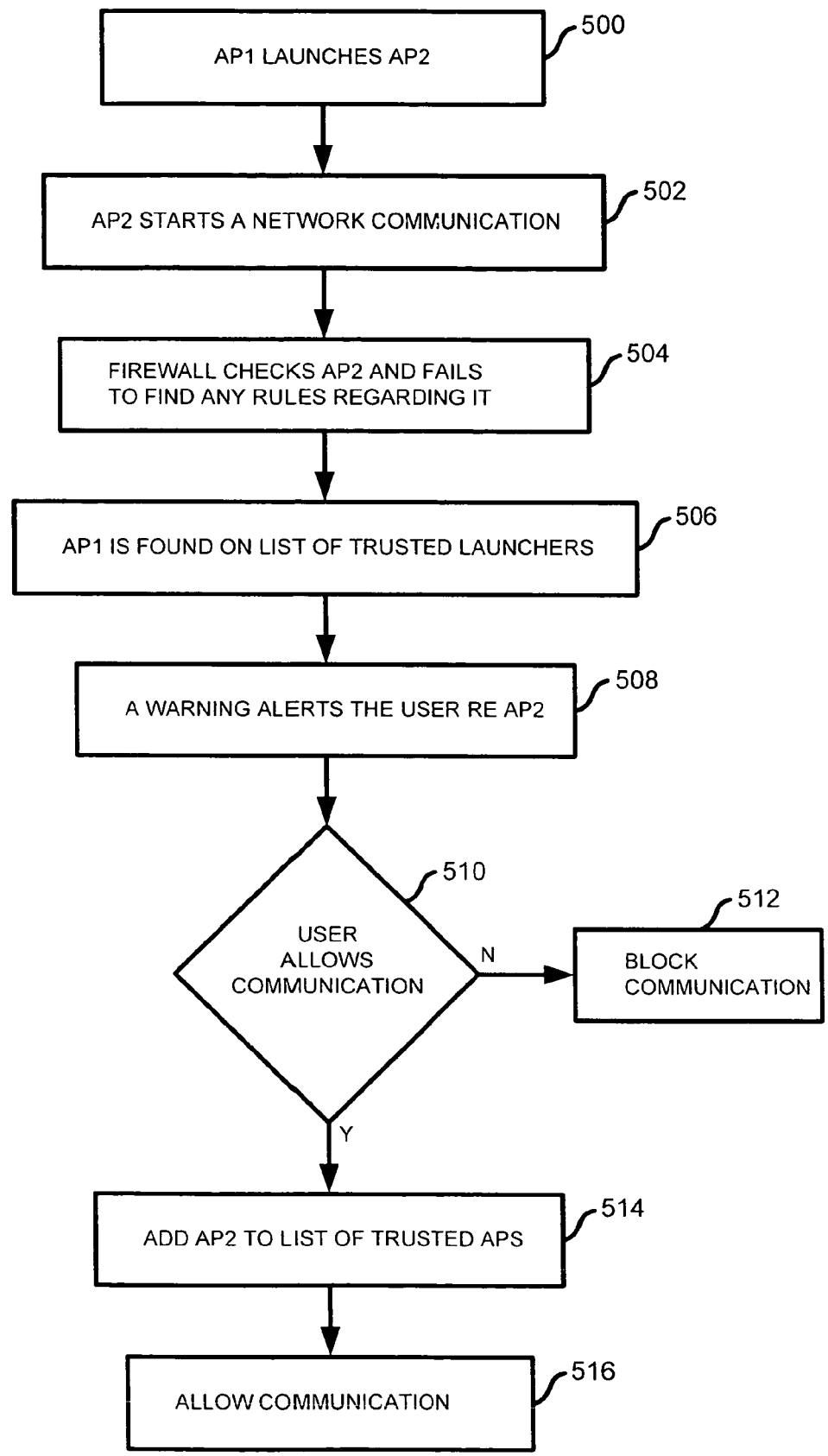
FIG. 5 is another example of an application of a method for detecting malicious applications according to an embodiment of the present invention.

FIG. 5 is another example of an application of a method according to an embodiment of the present invention. In this example, the first application launches a second application (500). The second application starts a network communication (502). The firewall checks the second application and fails to find any rules regarding it (504). The first application is then found on the list of trusted launchers (506). A warning then alerts the user regarding the second application (508). It is then determined whether the user allows the communication (510). If not, then the communication is blocked (512). If, however, the user allows the communication, then the second application is added to the list of trusted applications (514), and the communication is allowed (516).

Figure 6:
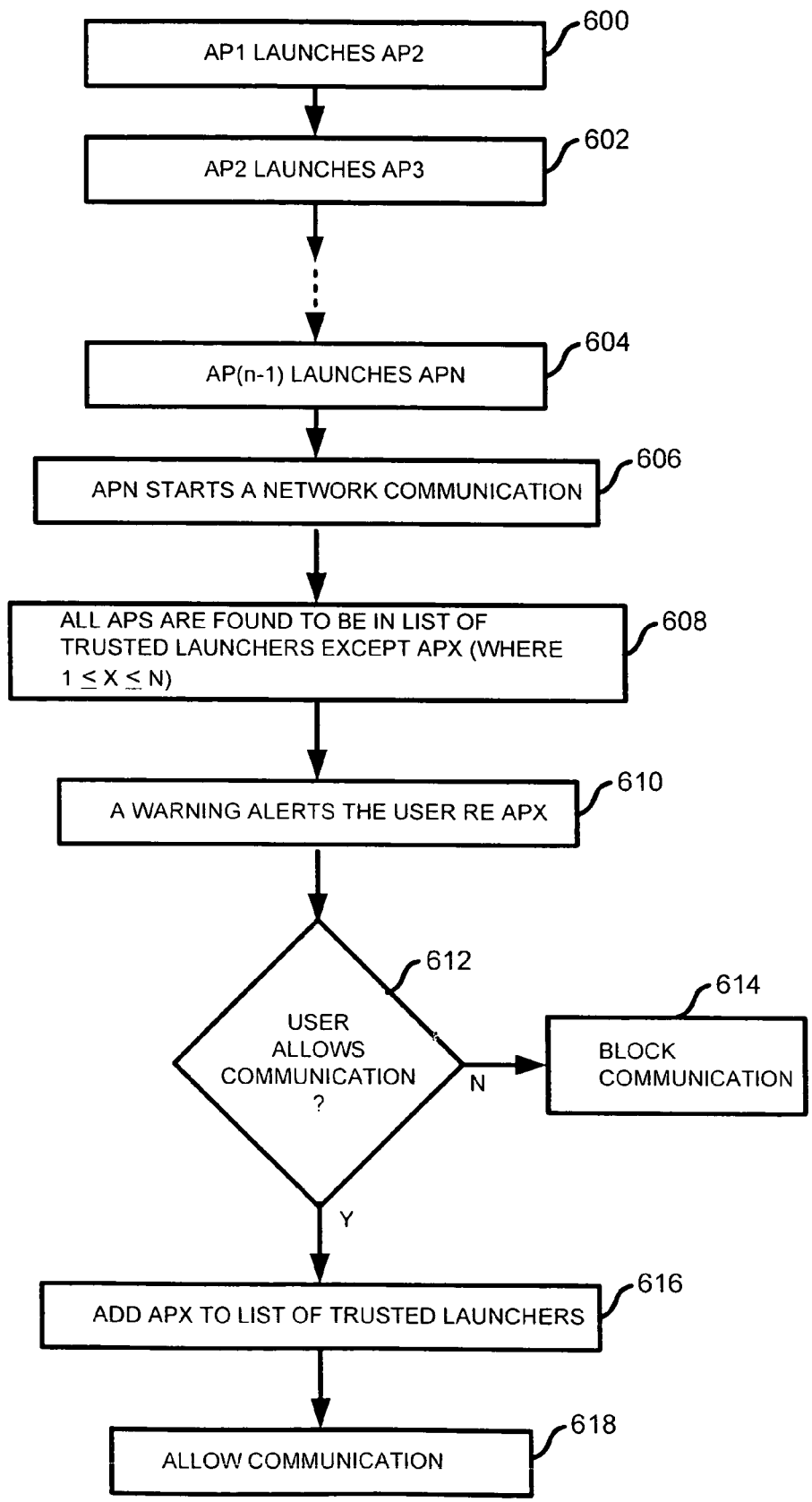
FIG. 6 is yet another example of an application of a method for detecting malicious applications according to an embodiment of the present invention.

FIG. 6 is yet another example of an application of a method according to an embodiment of the present invention. In this example, the first application launches a second application (600), the second application then launches a third application (602), etc., until eventually application (N−1) launches application N (604). Application N starts a network communication (606). All applications are found to be on the list of trusted launches except for application X, where X is greater or equal to 1 and less then or equal to N (608).

A warning alerts the user regarding application X (610). It is then determined whether the user allows the communication (612). If the user does not allow the communication, then the communication is blocked (614). If, however, the user allows the communication, then application X is added to the list of trusted launchers (616), and the communication is then allowed (618).

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for handling communications associated with computer applications comprising:
   determining whether a communication from a first computer to a second computer is attempting to occur, wherein the communication is associated with a first application that is trusted;
   determining whether a second application launched the first application;
   determining whether the second application is trusted; and
   initiating a security response relating to the communication in the event it is determined that the second application is not trusted.

2. The method of claim 1, further comprising associating the first application with the second application in a process tree.

3. The method of claim 1, further comprising listing the second application in a warning if it is determined that the second application is not trusted.

4. The method of claim 1, further comprising determining whether there is an untrusted launcher warning.

5. The method of claim 1, further comprising allowing the communication if there is no warning.

6. The method of claim 1, further comprising allowing the communication if the first application and second application are trusted.

7. The method of claim 1, further comprising allowing the communication if a user permits the communication.

8. The method of claim 7, further comprising adding the second application to a list of trusted launchers if the user permits the communication.

9. A system for handling communications associated with computer applications comprising:
   a processor configured to:
      determine whether a communication from a first computer to a second computer is attempting to occur, wherein the communication is associated with a first application;
      determine whether a second application launched the first application;
      determine whether the second application is trusted; and
      initiate a security response relating to the communication in the event it is determined that the second application is not trusted; and
   a memory coupled with the processor, wherein the memory provides instructions to the processor.

10. The system of claim 9, wherein the processor is further configured to list the second application in a warning if it is determined that the second application is not trusted.

11. The system of claim 9, wherein the processor is further configured to determine whether there is an untrusted launcher warning.

12. The system of claim 9, wherein the processor is further configured to allow the communication if a user permits the communication.

13. The system of claim 12, wherein the processor is further configured to add the second application to a list of trusted launchers if the user permits the communication.

14. A non-transitory computer-readable storage medium for handling communications associated with computer applications, the storage medium comprising computer instruction for:
   determining whether a communication from a first computer to a second computer is attempting to occur, wherein the communication is associated with a first application;
   determining whether a second application launched the first application;
   determining whether the second application is trusted; and
   initiating a security response relating to the communication in the event it is determined that the second application is not trusted.

* * * * *